United States Patent
Rannoux et al.

(10) Patent No.: US 10,913,196 B2
(45) Date of Patent: Feb. 9, 2021

(54) WRISTBAND AND ITS METHOD OF FABRICATION

(71) Applicant: The Swatch Group Research and Development Ltd, Marin (CH)

(72) Inventors: Claire Rannoux, Lausanne (CH); Nicolas Francois, Neuchatel (CH); Yannick Celerier, Aluze (FR); Catherine Blanc Petiot, Saint-Marcel (FR); Benoit Lafin, Saint-Christophe-en-Bresse (FR)

(73) Assignee: The Swatch Group Research and Development Ltd, Marin (CH)

( * ) Notice: Subject to any disclaimer, the term of this patent is extended or adjusted under 35 U.S.C. 154(b) by 133 days.

(21) Appl. No.: 16/068,417

(22) PCT Filed: Jan. 5, 2017

(86) PCT No.: PCT/EP2017/050173
§ 371 (c)(1),
(2) Date: Jul. 6, 2018

(87) PCT Pub. No.: WO2017/118678
PCT Pub. Date: Jul. 13, 2017

(65) Prior Publication Data
US 2019/0022912 A1 Jan. 24, 2019

(30) Foreign Application Priority Data
Jan. 7, 2016 (EP) .................................... 16150493

(51) Int. Cl.
*B29C 48/151* (2019.01)
*B29C 48/30* (2019.01)
(Continued)

(52) U.S. Cl.
CPC .......... *B29C 48/304* (2019.02); *B29C 48/151* (2019.02); *B29C 48/156* (2019.02);
(Continued)

(58) Field of Classification Search
CPC ... B29C 48/154; B29C 48/156; B29C 48/157; B29C 48/151
See application file for complete search history.

(56) References Cited

U.S. PATENT DOCUMENTS 3,610,488 A 10/1971 Tracy
4,234,657 A 11/1980 Bussey, Jr.
(Continued)

FOREIGN PATENT DOCUMENTS

DE 38 02 396 A1 8/1989
DE 195 13 647 A1 10/1995
(Continued)

OTHER PUBLICATIONS

JPO Notice of Reasons for Refusal in application JP 2018534806, dated Jun. 11, 2019 (Year: 2019).*
(Continued)

*Primary Examiner* — Timothy Kennedy
(74) *Attorney, Agent, or Firm* — Oblon, McClelland, Maier & Neustadt, L.L.P.

(57) ABSTRACT

A method of fabrication of a wristband of a watch or piece of jewelry, including: providing a first synthetic material; providing an extrusion line with a die plate for making an extrudate from the first material; providing one or more additional materials distinguished in their properties from the first material; providing a die plate including a first zone defining a profile allowing for fabrication of an extrudate having a hollow tubular profile at least at one of its ends in which the extrudate has a width corresponding to the length of one or two strands of the wristband; the die plate further
(Continued)

includes a second zone allowing defining of particular profiles selected from among a flat profile, a curved profile, or a profile with projecting zones.

7 Claims, 8 Drawing Sheets

(51) Int. Cl.
    *B29C 48/17*     (2019.01)
    *B29C 48/156*     (2019.01)
    *B29C 48/07*     (2019.01)
    *B29C 48/12*     (2019.01)
    *B29C 48/34*     (2019.01)
    *B29C 48/154*     (2019.01)
    *B29L 31/00*     (2006.01)
    *A44C 5/00*     (2006.01)
    *A44C 27/00*     (2006.01)

(52) U.S. Cl.
    CPC ............ *B29C 48/17* (2019.02); *A44C 5/0053* (2013.01); *A44C 27/001* (2013.01); *B29C 48/07* (2019.02); *B29C 48/12* (2019.02); *B29C 48/154* (2019.02); *B29C 48/34* (2019.02); *B29L 2031/722* (2013.01)

(56) References Cited

U.S. PATENT DOCUMENTS

| | | |
|---|---|---|
| 5,383,100 A | 1/1995 | Kikos |
| 6,482,352 B1 | 11/2002 | Sakata et al. |

FOREIGN PATENT DOCUMENTS

| | | | |
|---|---|---|---|
| EP | 1 172 164 A1 | | 1/2002 |
| FR | 1453496 | | 6/1966 |
| FR | 1 359 584 | | 7/1974 |
| GB | 634465 | | 3/1950 |
| JP | 52119358 A | * | 10/1977 |
| JP | S61-172517 U | | 10/1986 |
| JP | S61-190206 U | | 11/1986 |
| JP | 63120911 U | * | 8/1988 |
| JP | 2002-52594 A | | 2/2002 |
| JP | 2003-164307 A | | 6/2003 |
| KR | 10-2006-0125132 A | | 12/2006 |

OTHER PUBLICATIONS

International Search Report dated Mar. 15, 2017 in PCT/EP2017/050173 filed Jan. 5, 2017.

Notice of the Reason for Refusal dated Jun. 11, 2019 in corresponding Japanese Patent Application No. 2018-534806 (with English translation)(13 pages).

* cited by examiner

WRISTBAND AND ITS METHOD OF FABRICATION

CROSS-REFERENCE TO RELATED APPLICATIONS

This is a National phase Application in the United States of International Patent Application PCT/EP2017/050173 filed on Jan. 5, 2017 which claims priority on European patent application No. 16150493.1 filed on Jan. 7, 2016. The entire disclosure of the above patent applications are hereby incorporated by reference.

SUBJECT MATTER OF THE INVENTION

The present invention relates to the field of watch making and jewelry. More particularly, it relates to a method of extrusion or co-extrusion to make wristbands or costume jewelry, and to the wristbands or costume jewelry obtained by this method.

TECHNOLOGICAL BACKGROUND AND PRIOR ART

At present, the wristbands of watches or costume jewelry made of plastic are basically manufactured by molding, either injection or compression molding. These methods allow the rapid fabrication of large series of this type of object made of plastic with complex shapes. However, they have the drawback of requiring a costly tooling, even more costly when the object is complex. Moreover, if one wishes to obtain wristbands or costume jewelry with different colors or materials in the mass, it is necessary to resort to several stages of overmolding or bi-injection. In the following, we shall speak only of watch wristbands, but this is only an example not limiting of other objects, portable or otherwise, which can be made with this technique.

In the past, it was proposed to make watch wristbands by a method of extrusion, which is a less costly method. Thus, document GB 1359584 discloses a method of fabrication of a plastic band having cylindrical channels at the lateral ends, designed to receive the support rods of the watch case.

The fabrication of wristbands by extrusion is limited to the fabrication of wristbands of simple shape, monocolor, and made of the same material. Now, when the wristbands have a relief, different colors or a particular feel are highly prized by the clients. Besides the esthetic aspects, it may also be of interest to integrate various materials within the wristband in order to modify the functional properties of the wristband, such as to increase the rigidity in certain precise locations of the wristband subjected to greater mechanical stress. It is also possible to realize a surface with a pleasant feel, and a comfortable lower portion, for example one which limits perspiration, so as to be in permanent contact with the skin.

SUMMARY OF THE INVENTION

The present invention deals with the subject of producing wristbands having original geometries and motifs with the aid of a simple and economical method. Furthermore, the present invention proposes to make wristbands with variable functional properties, such as ones having reinforcements located in certain precise places.

For this purpose, the invention relates to a method of fabrication of a wristband of a watch or jewelry involving the steps of:

providing a first synthetic material,
providing an extrusion line with a die plate for making an extrudate from the first material,
characterized in that it involves at least one of the following steps:
  providing one or more additional materials distinguished in their properties from the first material
  providing a die plate having a first zone defining a profile allowing for the fabrication of an extrudate having a hollow tubular profile at least at one of its ends in which the extrudate has a width corresponding to the length of one or two strands of the wristband, and in that
said die plate furthermore has a second zone allowing the defining of particular profiles selected from among a flat profile, a curved profile, and a profile with projecting zones.

Particular embodiments are summarized in the claims dependent on claim 1.

BRIEF DESCRIPTION OF THE FIGURES

The characteristics and advantages of the present invention will appear upon reading the following detailed description making reference to the following figures.

DETAILED DESCRIPTION OF THE INVENTION

The present invention relates to a method of fabrication of wristbands for watches or costume jewelry by extrusion of plastic material.

The method may consist in the making of an extrudate having a width corresponding to the width of the wristband or in making an extrudate having a width corresponding to the length of one strand or of two strands of the wristband.

The wristband obtained with the method of the invention is characterized in having an original profile, stripes of colors, including luminescent stripes, or different properties depending on the position. Of course, it may have one or more of these characteristics.

Figure 1:
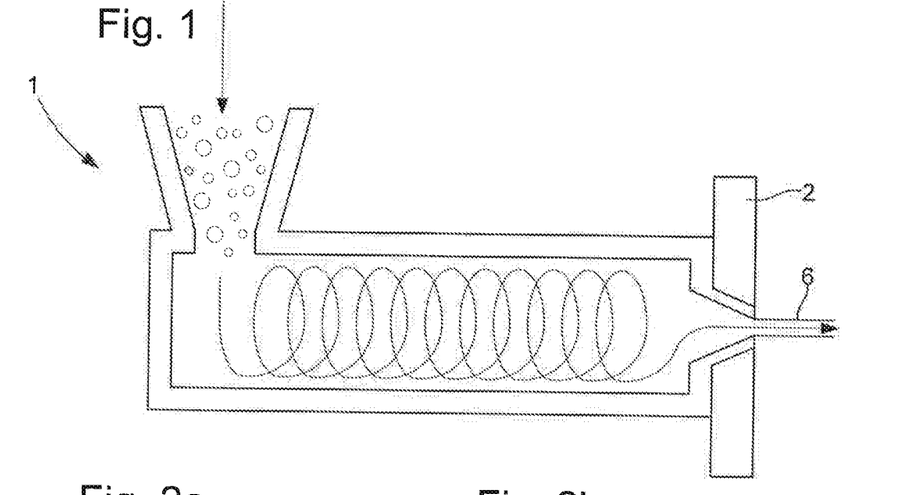
FIG. 1 is a schematic view of an extrusion line which is already known.
Figure 2A:
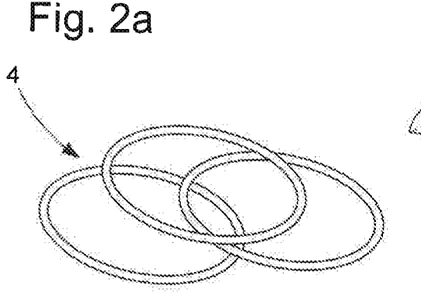
FIGS. 2a and 2b present a perspective view of wristbands made with an extrusion method. The wristbands according to this embodiment form respectively a tube in FIG. 2a and a curved band in FIG. 2b.
Figure 2B:
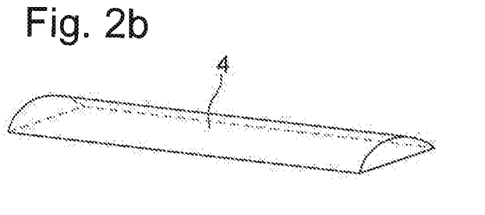
Figure 3:
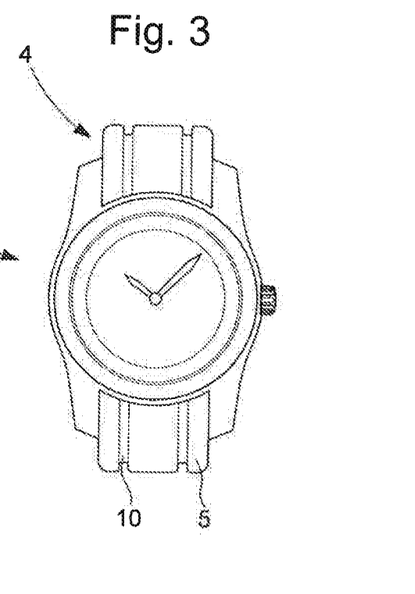
FIGS. 3 and 4 are perspective views of watches with a wristband made by an extrusion method. The wristbands have zones in relief separated by depressions.
Figure 4:
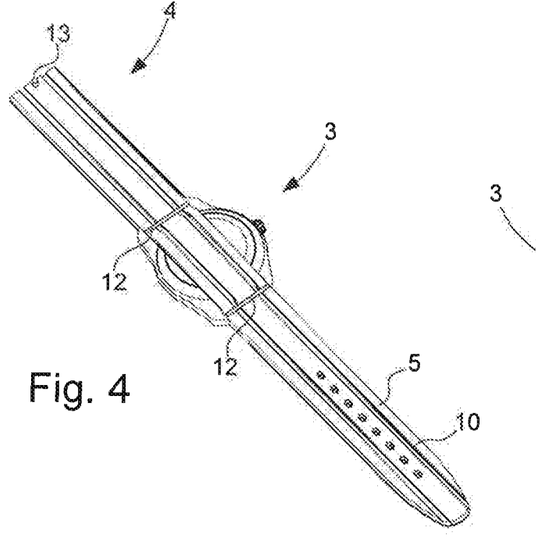

By original profile is meant a wristband of rounded transverse section forming, for example, an oval, a circle, or a half-spindle. As an example illustrated in FIGS. 1 and 2a, the die plate 2 of the extrusion line 1 is adapted to make a wristband 4 forming a solid or hollow tube. FIG. 2b shows a wristband with a profile forming a half-spindle, i.e., a curved profile formed by a flat edge surmounted by an edge with a certain radius of curvature. By original profile is likewise meant a wristband having three-dimensional motifs on its transversal section or on its longitudinal section, formed by zones in relief, which will be designated as projecting zones. For example, the wristband 4 made by the method may be formed of projecting longitudinal bands 5 separated by one or more depressions 10 as represented in FIGS. 3 and 4. Many profiles are conceivable with a symmetrical or asymmetrical profile in relation to the longitudinal or transverse axis of the wristband, respectively. The projecting zone or zones may extend longitudinally or transversely depending on whether the extrusion process involves making an extrudate with width corresponding to the width of the wristband or an extrudate with width corresponding to the length of one strand or two strands of the wristband.

Figure 5:
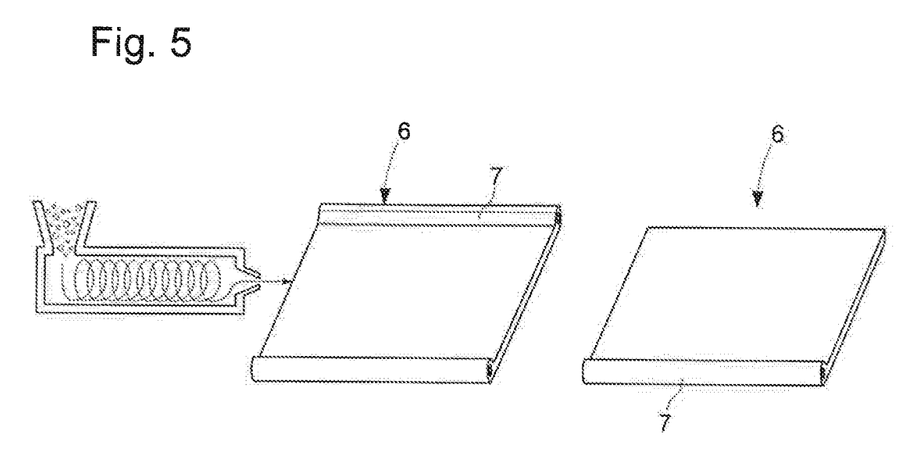
FIG. 5 is a schematic view of two extrudates emerging from the die plate. According to the invention, the wristband is extruded in the transverse direction of the wristband.
Figure 6:
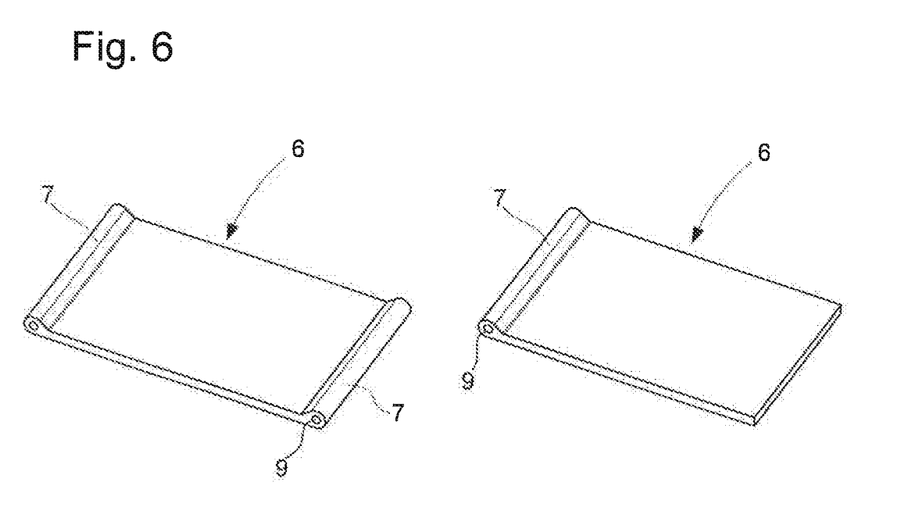
FIG. 6 is a perspective view of these same extrudates with a hollow tubular structure at one or at each lateral end.
Figure 15:
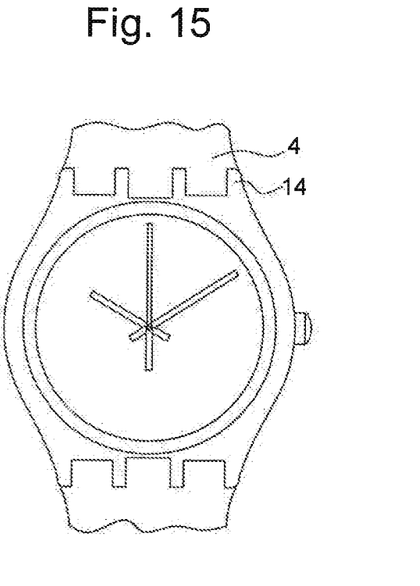
FIG. 15 shows a watch case with a system of cusps for attaching the wristband.
Figure 16:
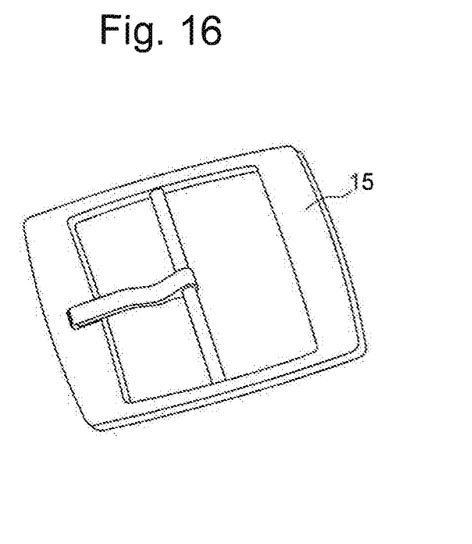
FIG. 16 shows a clasp buckle to be attached to the wristband with a bar system.

To facilitate the later assembly of the wristband with the watch case, it is advantageous to make an extrudate 6 with a width corresponding to the length of one strand having a hollow tubular projecting structure 7 at one or at each lateral end of the extrudate as represented in FIGS. 5 and 6. The hollow tubular structures form emergent holes 9 designed to receive respectively a bar enabling the attachment to a watch case with cusps 14 as shown in FIG. 15 and to a buckle 15 as shown in FIG. 16. It is likewise conceivable to make an extrudate 6 having a hollow tubular projecting structure 7 at only one lateral end. In this case, the latter forms an emergent hole designed to receive the bar, enabling the attachment to the watch case with cusps 14 (FIG. 15). It is moreover conceivable to make the two strands of the wristband starting from a single band with a tubular structure at one lateral end and two tubular structures situated near the center of the band and to afterwards make the necessary cuts to obtain the two strands.

We have described above the original profiles which may be obtained by virtue of the extrusion method of the invention. Thanks to this method, it is furthermore easy to combine several materials distinguished by their colors and/or their properties within the wristband.

Figure 7:
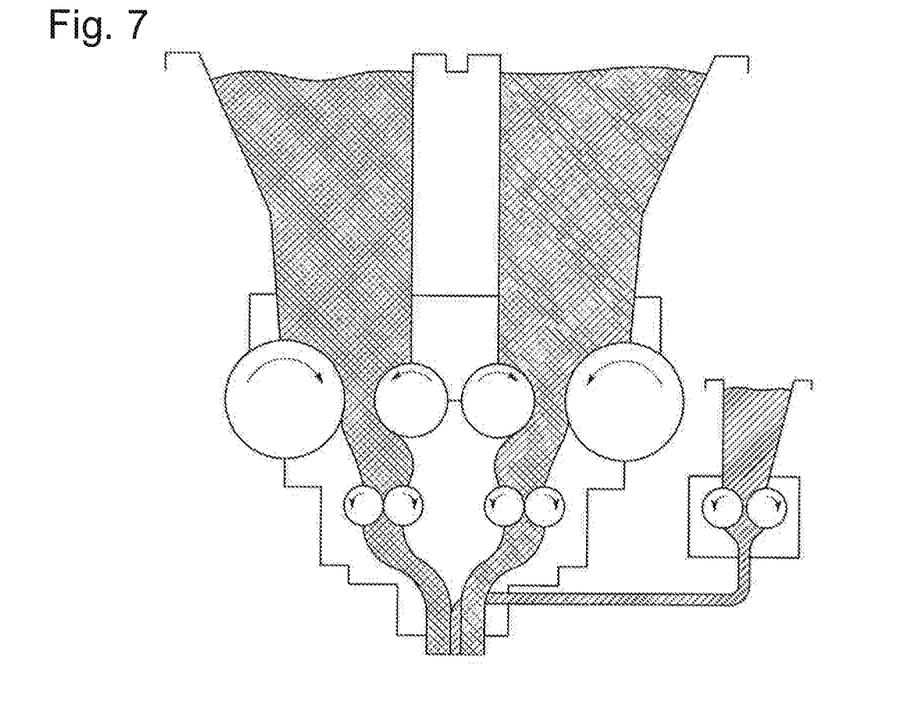
FIG. 7 is a schematic view of extruders upstream from the co-extrusion die plate.
Figure 8:
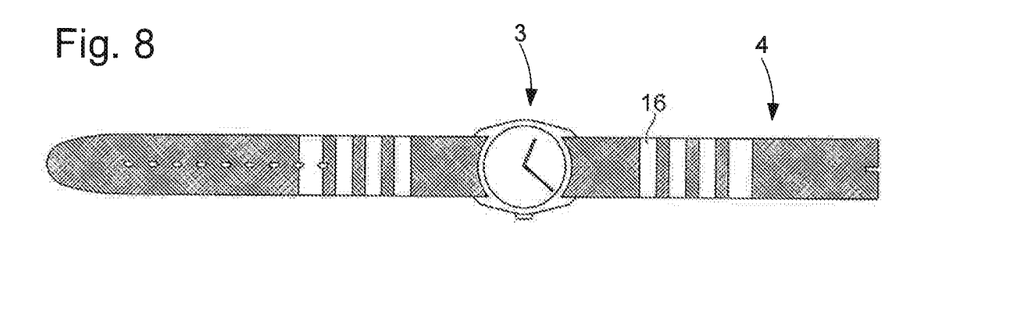
FIGS. 8 and 9 present a top view of the wristbands so obtained with transverse and longitudinal stripes, respectively.
Figure 9:
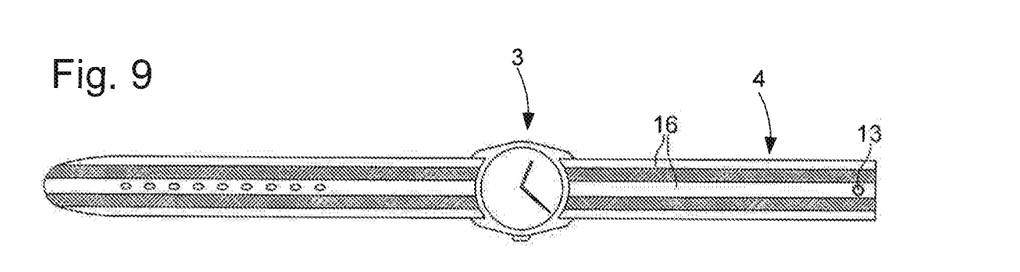
Figure 18:
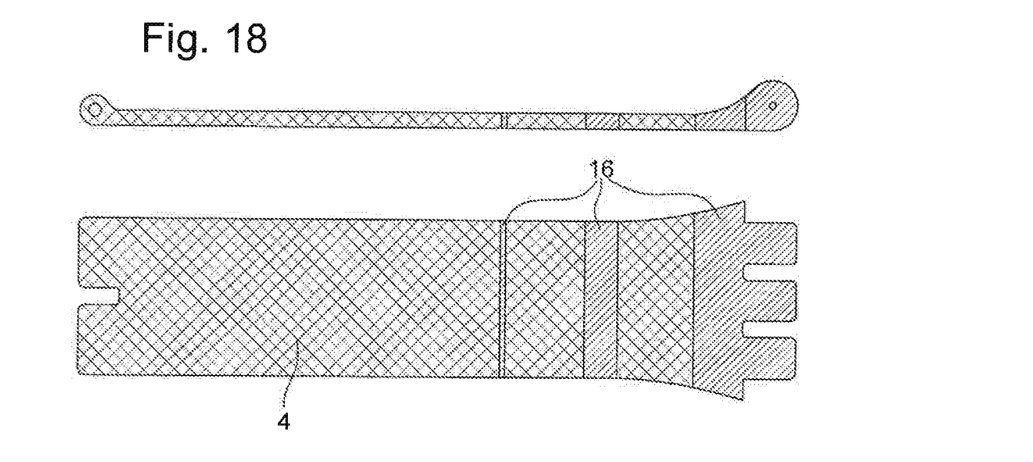
FIG. 18 shows a black wristband strand with phosphorescent bands obtained by the method of co-extrusion as described in the invention. A first view is a longitudinal cross section view of the wristband strand and the second view is a top view of the wristband strand.

Thus, wristbands having alternating bands 16 of different colors in the mass may be realized by co-extrusion (FIGS. 7 to 9). As previously, the bands 16 may extend longitudinally or transversely according to whether the extrudate has a width corresponding to the width or the length of the wristband. By bands of colors shall also be meant luminescent bands extending in the transverse or longitudinal direction. Thus, FIG. 18 illustrates the invention for a wristband having three transverse phosphorescent bands 16 in the mass. The bicolor and bimaterial co-extruded wristband has been made of thermoplastic polyurethanes (TPUs) using two integrated extrusion machines, with a common co-extrusion head. A first machine is used for the feeding of material A and a second machine for the feeding of the photoluminescent material B. The two thermoplastic materials are thus routed into the die plate and punch tooling, enabling a controlled distribution of the two flows of materials. The distributing of the two flows of raw materials is provided by the tooling, the small dimensional changes being modulated with the machine parameters (drawing speed, worm/sleeve temperatures, material flow rate, speed of rotation of the worms, etc.). Obviously, one may consider integrating a third machine with a new co-extrusion head receiving three different feeds in order to co-extrude this same type of wristband in triple material and/or in triple color.

Figure 10:
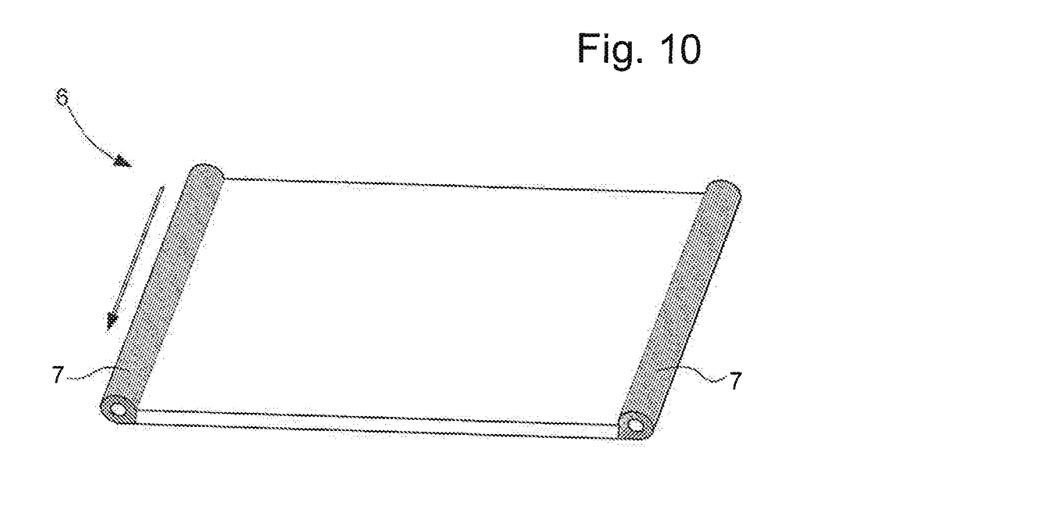
FIG. 10 is a perspective view of the extrudate produced by the method of the invention. It has a plastic material at its lateral ends which is different from the material situated at the center.
Figure 17:
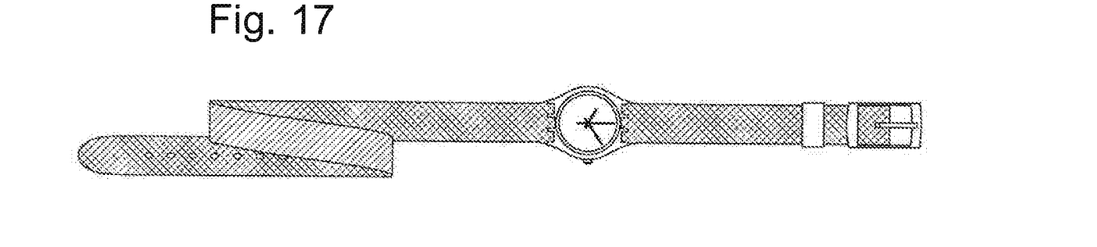
FIG. 17 shows a watch with a bicolored wristband having the color of the interior face different from the color of the exterior face.

It is likewise possible to obtain by this method of co-extrusion a bicolored wristband with one top color different from the bottom color in contact with the skin (FIG. 17). Materials having different physical characteristics may likewise be co-extruded to modulate the properties according to the zones of the wristband. In the case of an extrudate having a width corresponding to the length of a strand, as represented in FIG. 10, it is particularly advantageous to introduce at the lateral ends of the co-extrusion die plate a plastic material having better mechanical properties (better tear resistance, tensile strength, or a higher modulus of elasticity) since these zones of attachment to the case and to the buckle are particularly mechanically stressed. As an example, the central material may comprise a thermoplastic with a shore hardness A of 55 and the lateral ends a thermoplastic with a shore hardness D of 55. The co-extrusion further enables the producing of wristbands having a bottom material different from the top material. In particular, one may obtain a wristband with a comfortable soft lining on the bottom and a shiny finish on top. In another example, the wristband may comprise two co-extruded materials with a first material conferring antibacterial and/or anti-perspirant properties on the interior face of the wristband and a second material conferring a particular esthetic finish to the exterior face of the wristband.

Figure 11:
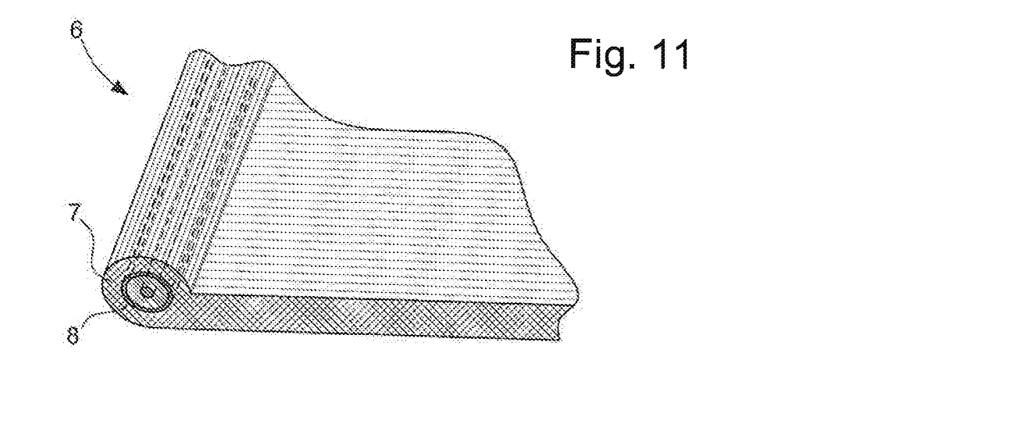
FIG. 11 is a partial perspective view of the extrudate made by the method of the invention with a reinforcement integrated in the area of its lateral ends.

According to another embodiment, a reinforcement 8 may be integrated during the extrusion to simulate the sewing thread, provide strength and rigidity for the plastic material in certain zones, or simply create a decoration. The reinforcement may be in the form of cables, tubes, carbon spring wires or another material of synthetic, natural, metallic or mineral origin. For example, a metallic or textile tube 8 may be integrated in the area of one or more hollow tubular structures 7, once again for the purpose of reinforcing this fragile portion of the wristband (FIG. 11).

According to another embodiment, the plastic material may be extruded to coat a band, such as a metal band. More precisely, the metal band may be a bistable spring steel band to make a wristband of the "Slap Wrap" type. The extrusion coating of a band makes it possible to combine the aspect of comfort and color of the plastic at the surface with a rigid strength provided by the band at the core, and to thus contemplate systems of watch wristbands without a clasp.

According to the invention, the synthetic materials used during the extrusion or the co-extrusion are blends comprising at least one thermoplastic polymer. Preferably, the blend comprises at least one thermoplastic elastomer (TPE) chosen from the following list:

TPE-O—thermoplastic olefins
TPE-S—more particularly the styrene compounds SBS, SEBS or SEPS
TPE-V—more particularly the compounds vulcanized PP/EPDM or the compounds TPSi-V (combination of thermoplastic and cross-linked silicone)
TPE-E—copolyester compound
TPE-U—thermoplastic polyurethane
TPE-A—thermoplastic polyamide
ionomeric resins.

Preferably, the principal material chosen has a shore A hardness between 55 and 75, it being possible to combine different zones of hardness in order to improve the comfort and the ergonomics or the mechanical strength of the wristband of the wristband, as already mentioned.

Moreover, the material or materials chosen to implement the method of the invention may contain ballasts to improve the comfort, the esthetic appearance, and the stability of the wristband over time:

Examples of Ballasts for Improving the Comfort:
Ceramics such as hexagonal boron nitride to dissipate heat and reduce sweating;
Textile fibers having a capillary effect to evacuate sweat;
Antibacterial agents such as silver particles or particles of zinc pyrithione or aluminum salts for an anti-odor effect;
Examples of Additives for Creating Interesting Esthetic Effects:
Colored pigments or colorants, compounds having fluorescent, phosphorescent, thermochromic or photochromic properties;
Examples of Additives to Improve the Stability of the Wristband Over Time:
Anti-UV additives.

These ballasts and additives may be added in the feed hopper of the worm of the extruder or they may have been previously integrated in the material. Once again in order to modulate the properties within the wristband, it is obviously conceivable in the case of the co-extrusion to introduce the ballasts and additives only in certain ones of the extruded materials.

After the fabrication of the wristband by extrusion, additional cutting steps may be carried out to facilitate the fixation of the wristband to the watch case in the event of an application in watch making, as well as to integrate the clasp.

Figure 12:
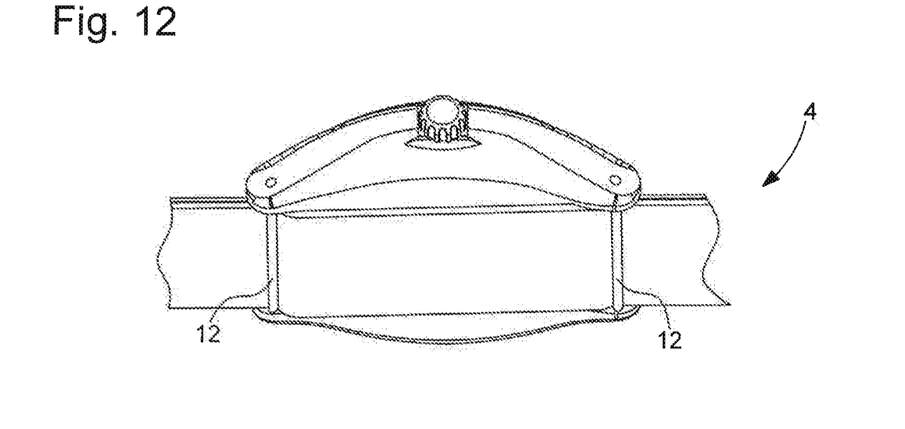
FIG. 12 is a partial perspective view of a watch with a wristband obtained by the method of the invention and secured to the case with a construction of NATO type.
Figure 13:
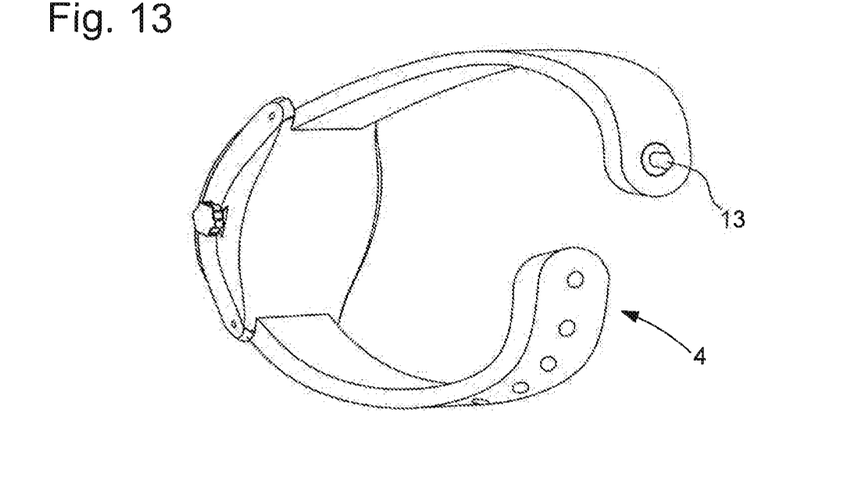
FIG. 13 is a perspective view of a watch with a wristband obtained by an extrusion method, with closure by a system of studs.

In the case of wristbands produced by the process of extrusion in the longitudinal direction of the wristband, the form of the wristband and the desired holes are obtained for example by punching, water jet cutting or laser cutting. The band obtained after extrusion may be a single piece and attached to the watch case with the aid of loops 12 arranged on either side of the watch case as shown in FIG. 12; this is a so-called NATO design. According to one variant, a short strand and a long strand are cut out in the plastic band in order to make a classical wristband. An operation of overmolding by compression is then needed to create the inserts, similar to the tubular structures of FIG. 6. It is also conceivable to introduce a clasp system with studs 13 lodged in a hole of the wristband (FIG. 13). It is also conceivable to realize a wristband without clasp, as for the rigid tubular wristbands of FIG. 2a. In this case, the free ends of the band are fused, in particular by a process of fusion by ultrasound, infrared or laser heating.

Figure 14:
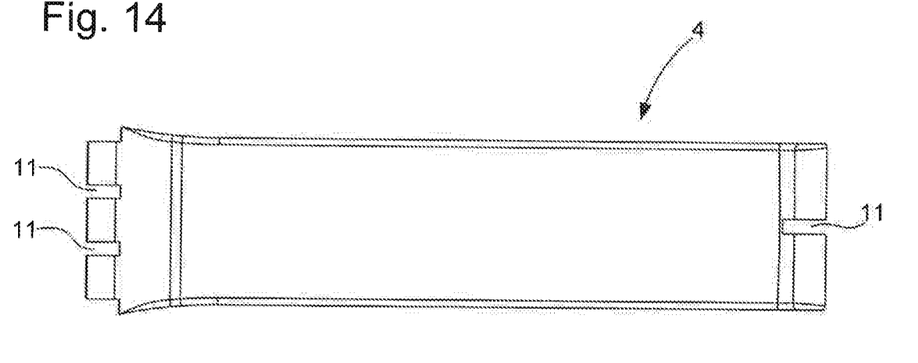
FIG. 14 shows a strand of the wristband obtained from an extrudate of FIG. 6 after laser cutting or punching to make the holes necessary for the attachment to the watch case and to the buckle.

In the case of the wristbands made by the extrusion process in the transverse direction of the wristband, the assembly with the watch case is easier to carry out. By laser cutting or punching or water jet in the area of the tubular structures, the respective hooks 11 are made for the watch case and for the buckle, as shown in FIG. 14. Other means of fixation to the case and clasping may also be contemplated, such as those described above.

Figure 19:
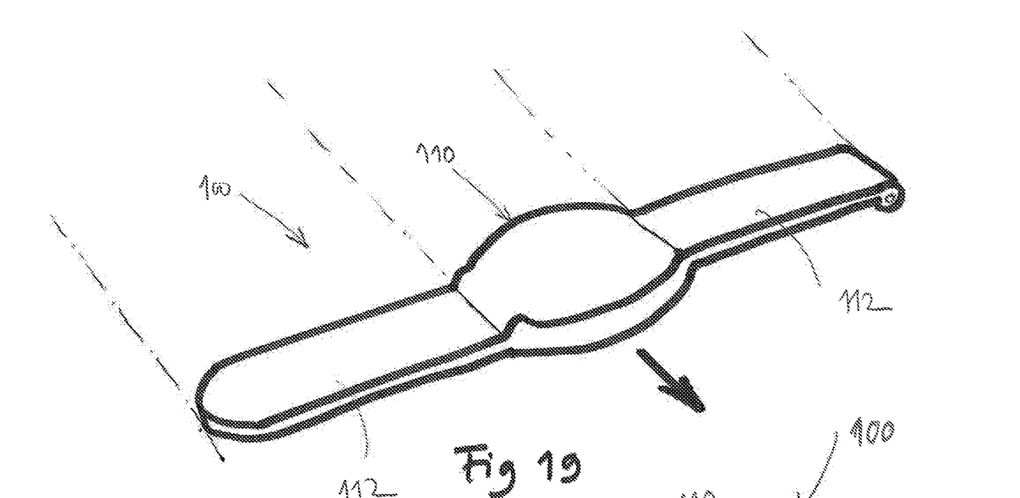
FIGS. 19 to 29 show various other variants of a wristband obtained by the method of the invention.

FIG. 19 illustrates another variant of an extrudate 100 designed to form a wristband according to the method of the invention by co-extrusion of two materials having different selected mechanical properties. The extrudate 100 comprises in an intermediate portion 110 located between two portions 112 of the extrudate 100. The intermediate portion 110 is designed to form a watch case, while the portions 112 are designed to form the flexible strands of a wristband.

The intermediate portion 110 is formed of a material, called the "case material", whose Young modulus is greater than the Young modulus of the material constituting the portions 112 forming the flexible strands of the wristband, called the "wristband strand material".

As an example, the watch case material has a Young modulus of the order of 2000 MPa and the wristband material has a Young modulus of the order of 30 MPa.

Preferably, the case material has a shore hardness greater than 50 shore D and the strand material has a shore hardness less than 75 shore A. Thus, the case material is sufficiently rigid to receive a container movement, and not be deformed except by the passage of the container and its holding by snapping in the watch case, as will be described below. The strand material, for its part, is sufficiently flexible to fit around the wrist of a user.

Figures 20, 21, 22:
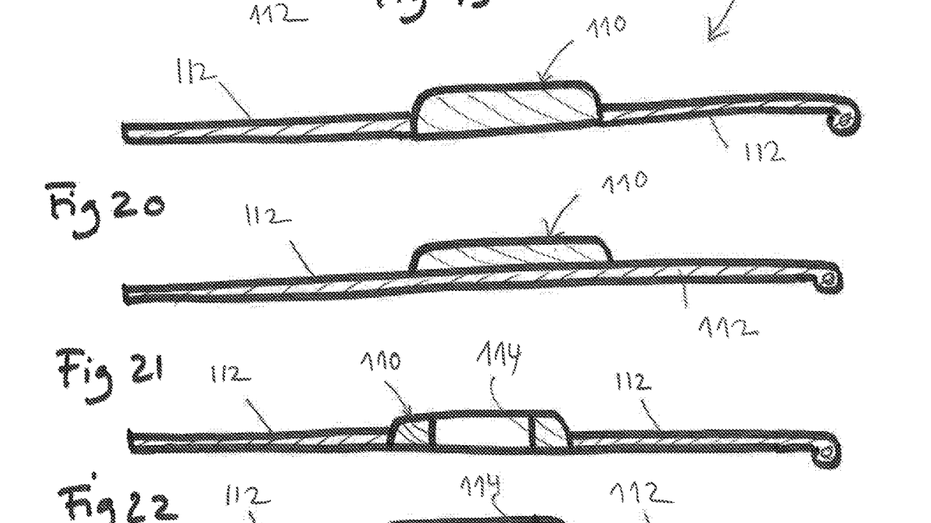

FIG. 20 illustrates one variant of the extrudate of FIG. 19 in which the intermediate portion 110 is connected to the wristband strands 112 by parts designed to form the sides of the watch case.

FIG. 21 illustrates a variant of the extrudate of FIG. 19 in which the intermediate portion 110 is connected to the wristband strands 112 by a part designed to form the bottom of the watch case.

Figures 23, 24, 25:
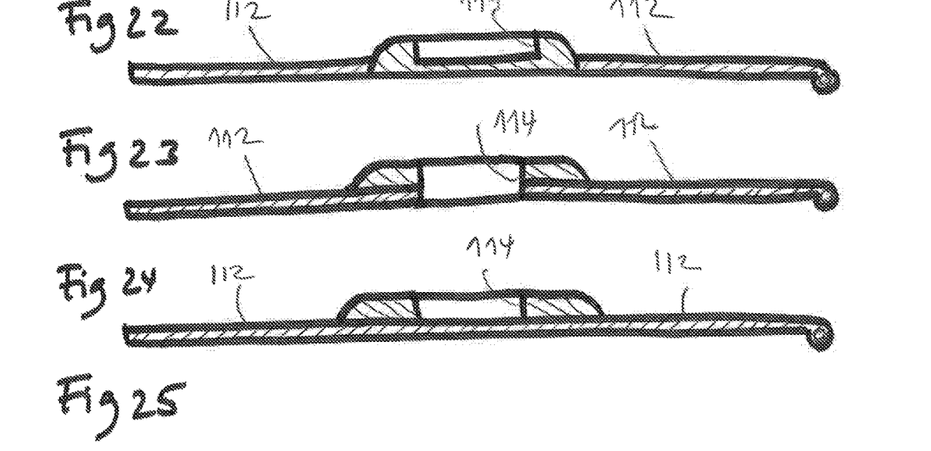

After the fabrication of the extrudate 100 according to one of FIGS. 19 to 20, in a further step one machines or punches an opening 114 in one face of the intermediate portion 110. The opening 114 may be a through opening (FIGS. 22, 24) or a blind opening (FIGS. 23, 25). The opening 114 can thus receive and hold in place a watch movement 116 of the container type, that is, a movement equipped with its encapsulated container display device closed by a glass (FIGS. 26 to 29). During this same step, the holes 118 for the passage of the tongue of a buckle or the passage of a pin are advantageously made.

Figure 26:
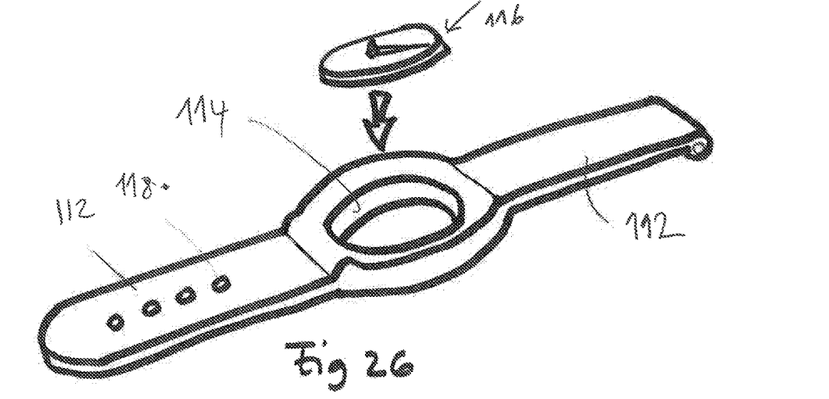
Figure 27:
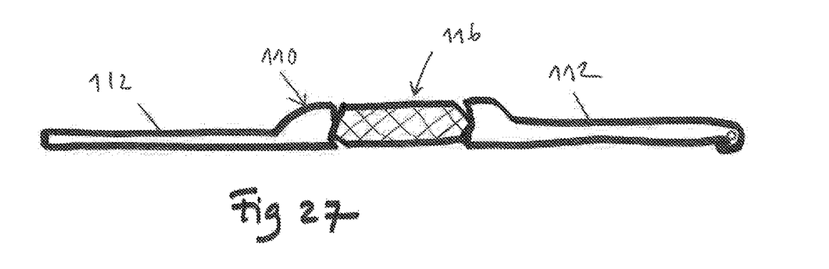
Figure 28:
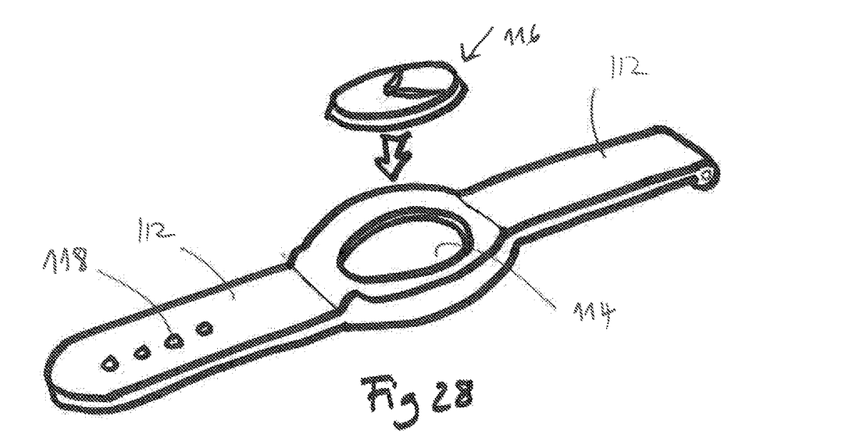
Figure 29:
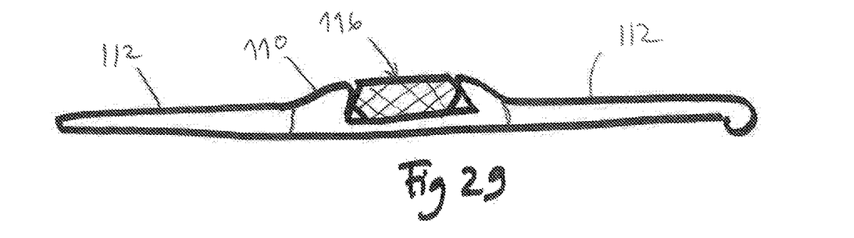

In the variant illustrated in FIGS. 26 and 27, the opening 114 is a through opening and the container movement can be inserted into the opening from the top or the bottom of the wristband. According to the variant illustrated in FIGS. 28 and 29, the opening 114 is blind. It will be noted that advantageously the opening may have a shoulder (not represented) in order to facilitate the positioning of the movement in the opening 114.

The wristbands so produced by extrusion have many advantages. The method is simple and not costly, while ensuring an elevated production rate. Multicolored wristbands stained in the mass with distinct bands can be obtained, unlike the current method of injection. All geometries can be contemplated. Furthermore, it is even possible to embellish the surface of the wristband with additional ornaments such as a stitching or a decoration by digital printing, ink jet, pad printing, etc.

The invention claimed is:

1. A method of fabrication of a wristband of a watch or piece of jewelry, comprising:
   providing a synthetic material;
   providing an extrusion line with a die plate for making an extrudate from the synthetic material;
   providing a reinforcing element integrated during extrusion through the die plate,
   wherein the reinforcing element is a tube directly coated with the synthetic material to make a wristband, and
   wherein the reinforcing element is integrated in an area of one or both lateral ends of the die plate so that the reinforcing element is perpendicular to a longitudinal direction of the wristband.

2. The method as claimed in claim 1, wherein the reinforcing element is a metal material.

3. The method as claimed in claim 2, further comprising water jet cutting or laser cutting or punching of the extrudate to form respective hooks for a watch case and for a clasp buckle.

4. The method as claimed in claim 1, wherein the synthetic material contains a ballast.

5. The method as claimed in claim 4, wherein the ballast is selected from the group of ceramic particles, antibacterial agents silver particles or particles of zinc pyrithione or aluminum salts, textile fibers, anti-UV compounds, pigments, fluorescent compounds, phosphorescent compounds, thermochromic compounds, photochromic compounds, or a mixture of these.

6. The method as claimed in claim 1, wherein the reinforcing element is completely surrounded by the synthetic material in a radial direction of the reinforcing element.

7. The method as claimed in claim 1, wherein the tube of the reinforcing element has a circular cross-section.

\* \* \* \* \*